United States Patent [19]

Hane

[11] Patent Number: 4,728,955
[45] Date of Patent: Mar. 1, 1988

[54] METHOD FOR POSITION-FINDING AND APPARATUS HEREFOR

[75] Inventor: Bengt Hane, Johanneshov, Sweden

[73] Assignee: Stiftelsen Institutet for Mikrovagsteknik vid Tekniska Hogskolan I Stockholm, Stockholm, Sweden

[21] Appl. No.: 847,908
[22] PCT Filed: Jun. 26, 1985
[86] PCT No.: PCT/SE85/00263
§ 371 Date: Feb. 25, 1986
§ 102(e) Date: Feb. 25, 1986
[87] PCT Pub. No.: WO86/00716
PCT Pub. Date: Jan. 30, 1986

[30] Foreign Application Priority Data
Jul. 4, 1984 [SE] Sweden ................................ 8403564

[51] Int. Cl.$^4$ ............................................. G01S 13/74
[52] U.S. Cl. ...................................... 342/140; 342/42
[58] Field of Search ........................ 342/42, 43, 44–47, 342/50, 51, 134, 139, 140

[56] References Cited
U.S. PATENT DOCUMENTS
4,151,525 4/1979 Strauch et al. .................... 342/46
4,333,078 6/1982 Henoch et al. .................... 342/44

Primary Examiner—T. H. Tubbesing
Assistant Examiner—Bernarr Earl Gregory
Attorney, Agent, or Firm—Nies, Webner, Kurz & Bergert

[57] ABSTRACT

A method for determining a mutual position between two objects, comprising transmitting a microwave signal from the first object towards the second object, causing the second object to receive the transmittal signal and re-transmit a signal, which is caused to be received by the first object. According to the invention the first object includes a transmitter/receiver unit (S/M-unit), which transmits the aforesaid signal ($f_o$) from a transmitter antenna. The second object (T) is caused to re-transmit the aforesaid signal modulated with a signal ($f_m$), the first object being caused to receive the transmitted signal through at least two antennae ($M_1$, $M_2$) placed symmetrically on a respective side of the transmitter antenna (S) and in an antenna plane common with the transmitter antenna (S). The angle ($\theta$) between the antenna plane and the second object, at least in one dimension, is determined by a phase comparison or an amplitude comparison of received signals, in dependance on whether or not the second object (T) is located in the so-called proximity zone of the first object. The invention also relates to apparatus for carrying out the method.

10 Claims, 12 Drawing Figures

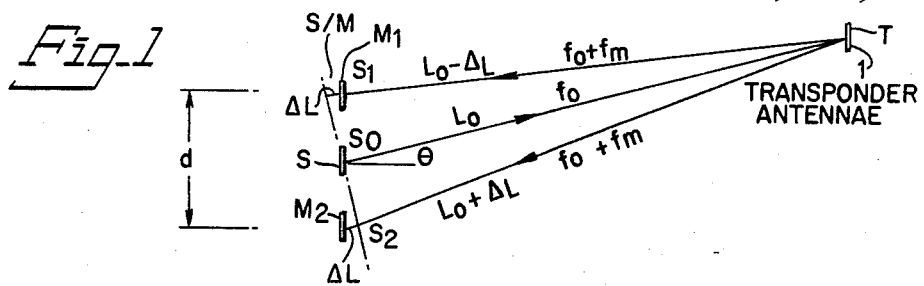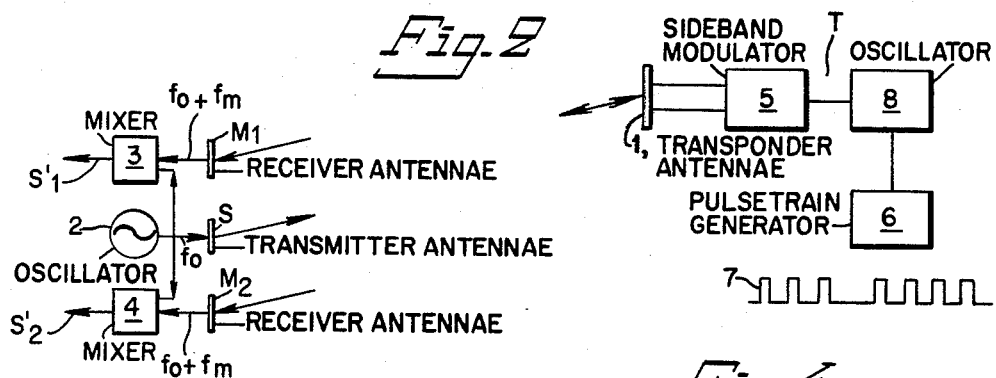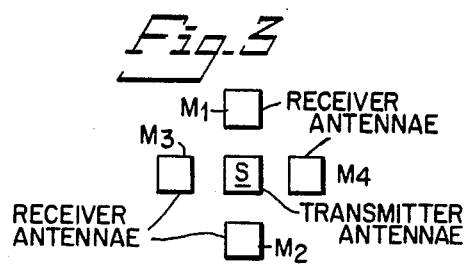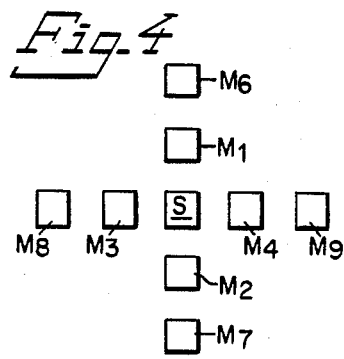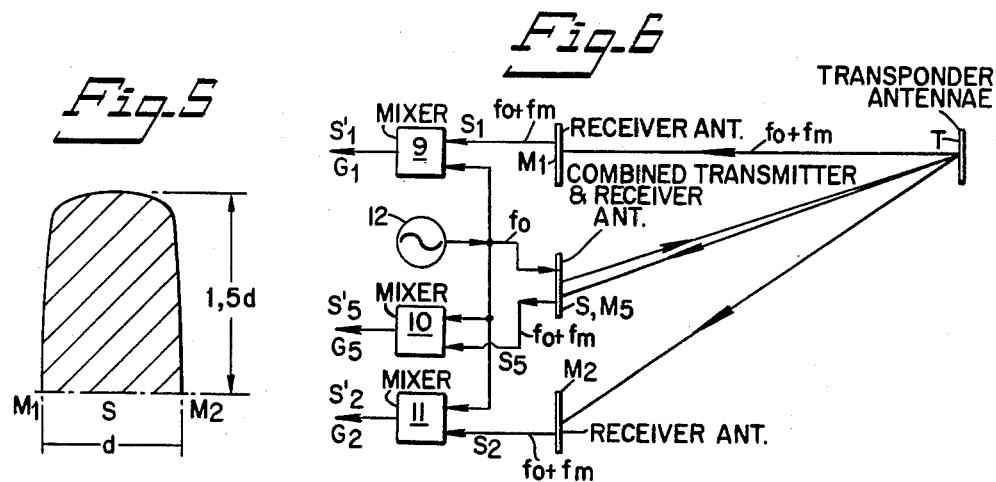

METHOD FOR POSITION-FINDING AND APPARATUS HEREFOR

The present invention relates to a method for determining a mutual position between two objects, and apparatus herefor.

A need for measuring the mutual positions between two objects is to be found in a number of industrial applications and other forms of application, such as the relative positions of a movable and a stationary object. One applicable example is that of a robot adapted to seek automatically an object in order to carry out work thereon. If the position of the robot relative to the object is unknown, it is necessary to use a position meter in order to first determine the position of the robot in relation to the object. Another example is that of determining the position of equipment, such as machines, in relation to the surroundings, for example different ground reference points.

The present invention is particularly suitable for determining the mutual positions of two objects in relation to one another in those cases where a first object is intended to seek a second object. It will be understood, however, that the present invention can be applied on all occasions where there is a need of determining the relative positions of two objects.

The present invention relates to a method for determining a mutual position between two objects, which comprises transmitting a microwave signal from the first object to the second object; causing the second object to receive the signal and to re-transmit a signal which is received by the first object, and which method is characterized in that the first object incorporates a transmitter/receiver which is caused to transmit said signal from a transmitter antenna at a frequency $f_o$; in that the second object is caused to re-transmit said signal modulated with a signal $f_m$; in that the first object is caused to receive the re-transmitted signal on at least two antennae placed symmetrically on a respective side of the transmitter antenna in an antenna-plane common with said transmitter antenna; and in that the angle between said antenna-plane and said second object in at least one dimension, namely in a first plane passing through the transmitter antenna and the two receiver antennae, is determined by respectively a phase comparison and an amplitude comparison of received signals, depending upon whether the second object is located in the so-called proximity zone of the first object or not, i.e. located at a distance which is shorter, or not, than a distance of the same order of magnitude as the distance d between said two receiver antennae, wherein when the second object is located outside said proximity zone said angle is determined by a phase comparison between the signal received by respective antennae subsequent to being mixed with the transmitter signal $f_o$, where the phase difference between the signals is determined; and in that said angle is determined with the aid of a computer device associated with the transmitter/receiver unit from the relationship $$\Theta = \arcsin\left[\frac{(F_2 - F_1) \cdot C}{2\pi \cdot f_o \cdot d}\right]$$

where c is the speed of light and d is the distance between the two receiver antennae.

The invention also relates to apparatus of the kind set forth in claim 6 and having the fundamental characteristics disclosed therein.

It is possible when using the method and apparatus according to the invention to determine the direction in which a reference point lies in relation to a transmitter/receiver unit, referred to as the S/M-unit. The reference point is a transponder T.

The values are determined in accordance with the invention with the use of microwaves. By using microwaves instead of optical systems, for example, there is obtained a system which will not be influenced by a troublesome environment, such as an environment which incorporates dust, dirt, light-reflections etc. This has an important significance in industrial applications.

A particular problem arises when the transponder lies close to the S/M-unit, or more precisely within the so-called proximity zone of the S/M-unit.

This problem is resolved in that the S/M-unit switches from a mode in which the difference in phase between received microwave signals is measured to a mode in which the amplitude of said signals is measured. This is a highly significant contribution to the art of position finding by phase measurement, since by utilizing an amplitude measuring technique it is possible to lead an object, such as a robot, right up to the target object.

The invention will now be described in more detail with reference to a number of exemplary embodiments thereof and to explanatory diagrams illustrated in the accompanying drawings, where FIG. 1 illustrates the principle of angular measurement;

FIG. 2 is a block schematic illustrating a transmitter/receiver unit for phase measurement;

FIGS. 3 and 4 illustrate two mutually different embodiment with alternative positioning of the antennae of the transmitter/receiver unit;

FIG. 5 illustrates schematically the principle propagation of the so-called proximity zone;

FIG. 6 is a block schematic of a transmitter/receiver unit for amplitude measurement;

Figure 7:
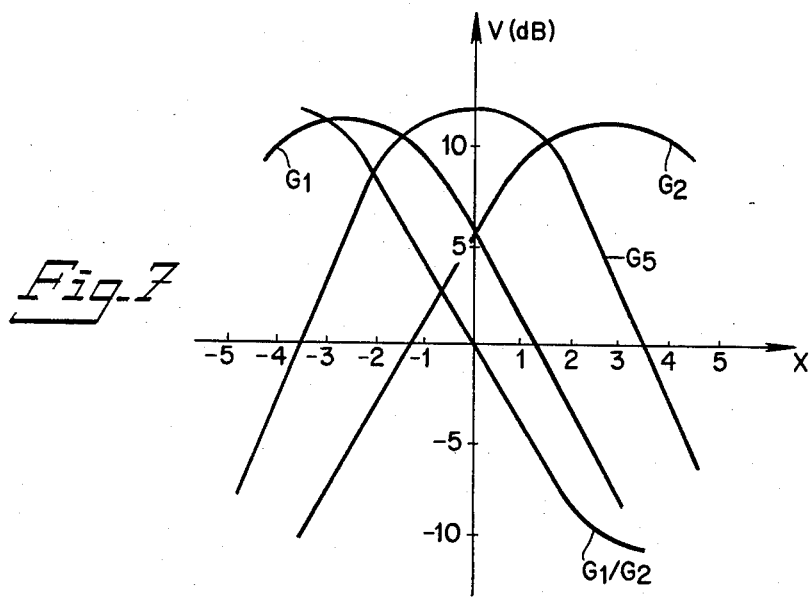
FIG. 7 is a diagram in which the amplitude of the received signal is shown as a function of the position of the receiver antennae.

FIG. 1 illustrates the principle of angular measurement in a single plane. The transmitter/receiver unit S/M has located in said plane two receiver antennae $M_1$, $M_2$, and a transmitter antenna S. The transponder T includes a receiver antenna and a transmitter antenna, both of which are preferably combined in a transponder antenna 1. The transmitter/receiver unit, referred to as the S/M-unit, is adapted to transmit a microwave signal having a frequency, for example, of $f_o = 2450$ MHz. As explained in more detail hereinafter, the transponder is adapted to receive the signal $f_o$ and to re-transmit a signal $f_o + f_m$, where $f_m$ is, for example, 10 kHz, i.e. to reflect the signal $f_o$ transmitted by the S/M-unit.

The reflected signal is received by the receiver antennae $M_1$, $M_2$, which are symmetrically positioned at a given mutual distance apart on a respective side of the transmitter antenna S. Because of the difference in the distance travelled by the reflected and received signals $f_o+f_m$, there is a difference in the phases of the signals received on the antennae $M_1$, $M_2$ corresponding to the difference in the aforesaid distances. The signal received on the antenna $M_1$ has travelled the distance $2L_o-\Delta L$ where $L_o$ is the distance from the transmitter antenna S and the transponder antenna 1. The signal received on the antenna $M_2$ has travelled the distance $2L_o+\Delta L$. The signals $S_1$ on the antennae $M_1$, $S_2$ on the antenna $M_2$ and $S_o$ on the transmitter antenna can be described in accordance with the relationships $$S_o = \cos(2\pi \cdot f_o \cdot t) \quad (1)$$

$$S_1 = k_1 \cdot \cos\left[2\pi(f_o + f_m)\left(t - \frac{2L_o - \Delta L}{c}\right)\right] \quad (2)$$

$$S_2 = k_2 \cdot \cos\left[2\pi(f_o + f_m)\left(t - \frac{2L_o + \Delta L}{c}\right)\right] \quad (3)$$

where $k_1$ and $k_2$ are constants and c is the speed of light.

The S/M-unit is illustrated schematically in FIG. 2. The reference 2 identifies a local oscillator adapted to generate a signal having the frequency $f_o$, this signal being passed to the transmitter antenna S, and to each of two homodyne mixers 3,4. The second input of the mixer 3 is connected to the one receiver antenna $M_1$, while the second input of the other mixer 4 is connected to the other receiver antenna $M_2$. The prevailing frequencies are given in FIG. 2.

Subsequent to homodyne mixing of the signal in the mixer 3,4 there are obtained the signals $S_1'$ and $S_2'$ respectively according to the equations $$S_1' = k_3 \cdot \cos(2\pi \cdot f_m \cdot t + \phi_1) \quad (4)$$

$$S_2' = k_4 \cdot \cos(2\pi \cdot f_m \cdot t + \phi_2) \quad (5)$$

where $$\phi_1 = \frac{2\pi \cdot f_o}{c}(2L_o - \Delta L) \text{ and} \quad (6)$$

$$\phi_2 = \frac{2\pi \cdot f_o}{c}(2L_o + \Delta L) \text{ and} \quad (7)$$

where $k_3$ and $k_4$ are constants.

The phase difference between $S_1'$ and $S_2'$ is given by $$\phi_3 = \phi_1 - \phi_2 = \frac{2\pi \cdot f_o}{c} \cdot 2 \cdot \Delta L \quad (8)$$

The angle $\Theta$ between the antenna plane of the S/M-unit and the transponder T, c.f. FIG. 1, can be expressed $$\Theta \arcsin\left(\frac{2\Delta L}{d}\right) \quad (9)$$

where d is the distance between the two receiver antennae $M_1$, $M_2$. From the equations there is obtained $$\Theta = \arcsin\left(\frac{\phi_3 \cdot c}{2\pi f_o \cdot d}\right) \quad (10)$$

Thus, by measuring the phase difference $\phi_3$ it is possible to measure the angle $\Theta$ between the S/M-unit and the transponder T through the intermediate frequency $f_m$ obtained with said homodyne mixing of the signal, and the phase measurement can be effected at a low frequency instead of at a microwave frequency.

The afore-description related to measurement in a single plane, i.e. in one dimension. By providing a further two receiver antennae $M_3$, $M_4$ in a second plane at right angles to the first plane in which the receiver antennae $M_1$, $M_2$ are located, and by placing these further receiver units $M_3$, $M_4$ in a corresponding manner on both sides of the transmitter antenna S, and by providing a further two mixers, it is possible to determine an angle $\Theta'$ between the S/M-unit and the transponder in said second plane, wherewith the angular position of the transponder T in relation to the S/M-unit is determined in two mutually perpendicular planes.

The accuracy at which the angles $\Theta$, $\Theta'$ can be determined increases with increasing distance d. On the other hand the angle of maximum clarity is decreased herewith. In order to obtain non-ambiguity or clarity within the angular range $-45° < \Theta, \Theta' < 45°$ the distance d must be greater than $\lambda/\sqrt{2}$, where $\lambda$ is the wavelength at the frequency $f_o$, where $-180° < \phi_1, \phi_2 < +180°$.

One method of increasing the accuracy while retaining a large angle of maximum clarity is to arrange further receiver antennas $M_6$, $M_7$ and $M_8$, $M_9$ respectively, see FIG. 4, externally of and in the same plane as the aforesaid receiver antennae $M_1$, $M_2$ and $M_3$, $M_4$ respectively.

The transponder T is preferably in the form of a so-called recording indicator of the kind described in Swedish Patent Specification No. 7503620-2. This recording indicator comprises a transmitter antenna and a receiver antenna, which may comprise an antenna 1. Connected to the antenna is a simple sideband modulator 5. A pulsetrain generator 6 is arranged to generate a pulsetrain 7, preferably of individual appearance for each of the transponders in that case when a plurality of mutually different transponders T are provided, the pulsetrain being controlled by an oscillator 8. The frequency $f_m$ generated by the oscillator 8 is applied to the modulator 5, for example when a pulse in the pulsetrain is delivered to the oscillator, since the oscillator will only generate the frequency $f_m$ when one pulse is delivered. The signal supplied to the antenna 1 thus comprises a pulsetrain corresponding to the pulsetrain 7, comprising the frequencies $f_o+f_m$, where the frequency $f_o$ prevails between the pulses in the pulsetrain 7 and the frequency $f_o+f_m$ prevails during each pulse.

By making the pulsetrain 7 individual for each transponder T and by providing the S/M-unit with a decoder adapted to decode the pulsetrain for identification of the transponder T, the S/M-unit is able, where appropriate, to determined the angles $\Theta$, $\Theta'$ of one transponder selected from a plurality of transponders.

This embodiment affords a particular advantage when the S/M-unit is used to guide a robot arm towards an object, where one of a plurality of transponders is selected in dependence on a desired robot operation, or where the robot arm is intended to seek a plurality of mutually different objects in a given order of progression.

This latter description relates to determining the position of a transponder in relation to the S/M-unit in two dimensions. In the case of practical applications, however, it is necessary in certain instances to also measure the mutual position in the third dimension.

It is certainly sufficient in many cases to measure in two dimensions. When the invention is applied to a robot, the robot can be so constructed that, on the basis of a measurement of $\Theta$, $\Theta'$, the arm of said robot is moved in the direction given by said angles, and if necessary to carry out a plurality of measurements during movement of the robot arm until indication is obtained through a suitable device that the robot arm has reached its target.

It is often necessary, however, to obtain information concerning the distance to the object, particularly when the robot arm approaches said object more closely. Thus, it is desirable to obtain such information in the so-called proximity zone, indicated by the shaded area in FIG. 5, i.e. when the S/M-unit and the transponder T are in close proximity of one another. In the proximity zone the distance between the objects is of the same order of magnitude as the distance d. More specifically, the proximity zone extends outwardly from the S/M-unit to an extent corresponding to 1.5.d and has a width equal to d. It is of primary importance to be able to detect with high precision when the transmitter antenna of the S/M-unit lies centrally of the transponder antenna.

In accordance with a preferred and highly important embodiment of the present invention, the amplitude of the signals received by the S/M-unit is measured instead of the phase differences of said signals, in order to determine the position of the S/M-unit in the proximity zone three-dimensionally. There is used in this embodiment of the invention an arrangement schematically illustrated in FIGS. 6 and 9, this arrangement having the same principle construction as the arrangement illustrated in FIG. 2, but with the difference that the signal received by each of the receiver antennae $M_1$, $M_2$, $M_5$ is mixed with the frequency $f_o$ generated by the oscillator 12 in mixers 9,10,11, wherewith three signals $S_1'$, $S_2'$, and $S_5'$ corresponding to the equations (4) and (5) above are produced. Thus, the transmitter antenna S also forms a receiver antenna $M_5$, see FIG. 9. The embodiment of FIG. 9 also incorporates two further antennae $M_3$ and $M_4$, analogous with the antenna array illustrated in FIG. 3, to enable measurement to be effected in two mutually perpendicular planes. One further difference is that the mixers 9,10,11 are provided with a respective output for a signal $G_1$, $G_2$ and $G_5$ corresponding to the amplitude of the signal received from the antennae $M_1$, $M_2$ and $M_5$ respectively.

In FIG. 7 the measured amplitudes $G_1$, $G_2$ and $G_5$ are illustrated as a function of the position of the transponder T when its antenna is displaced laterally in relation to the antennae of the S/M-unit. The perpendicular distance between the antenna of the transponder T and the antennae of the S/M-unit is thus constant.

When the transponder T lies centrally of the transmitter antenna S the ratio of $G_1/G_2 = 1$ (0 dB). When the transponder lies to the left of the antenna S, $G_1/G_2 < 1$, while when it lies to the right of said antenna $G_1/G_2 < 1$. In the proximity zone the logarithm of the quotient $G_1/G_2$ is proportional to the distance X, which indicates lateral displacement. The quotient $G_1/G_2$ is also proportional to the angles $\Theta$, $\Theta'$.

Thus, it is possible with the aid of the logarithm of the quotient $G_1/G_2$ to determine lateral displacement of the transponder antenna in the plane relative to the transmitter antenna S/M-unit.

By using three receivers $M_1$, $M_2$, $M_5$, as described above, it is also possible to determine the magnitude R in accordance with the expression (11) and also the distance Z between the S/M-unit and the transponder. The distance Z is namely an unequivocal function of the quotient $$R = \frac{G_5}{\sqrt{G_1/G_2}} \tag{11}$$

Figure 8:
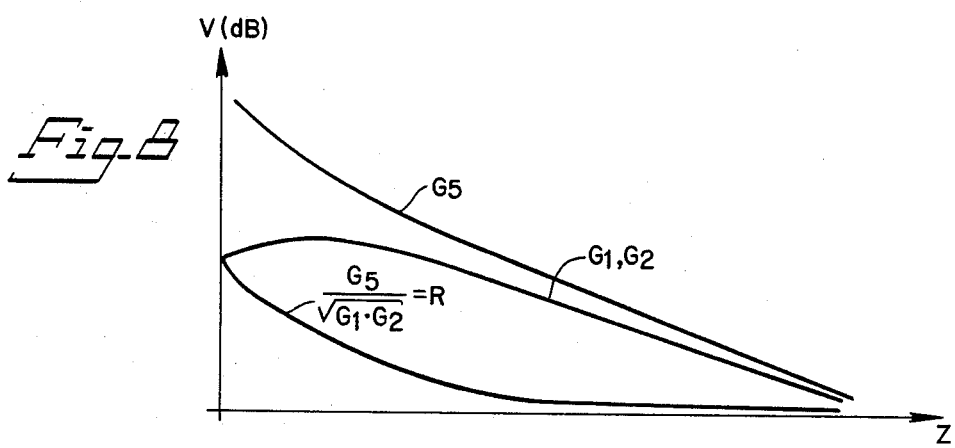
FIG. 8 is a diagram in which the amplitude of the received signal is shown as a function of the distance between transponder and the receiver antennae.

FIG. 8 illustrates the amplitude $G_5$, the quotient $G_1/G_2$ and the quotient R as a function of the distance between the transponder antenna 1 and the transmitter antenna S when said antennae lie centrally opposite one another.

The function $Z = F(R)$ can be approximated with a polynominal function. The appearance of the function is determined, inter alia, by the geometry of the antenna arrangement and the frequency.

Thus, when the transponder is located in the proximity zone, both direction and distance to the transponder can be determined.

In accordance with a preferred embodiment of the invention, the S/M-unit switches from a mode in which the angles $\Theta$, $\Theta'$ are determined to a mode in which phase differences are determined, in order to determine distance and angles to the transponder in accordance with the embodiment just described, when the transponder enters the proximity zone. Preferred conditions for transition from a so-called remote mode to a so-called proximity mode are given hereinafter, where the invention is further described with reference to an embodiment concerning measurement in two mutually perpendicular planes.

Figure 10:
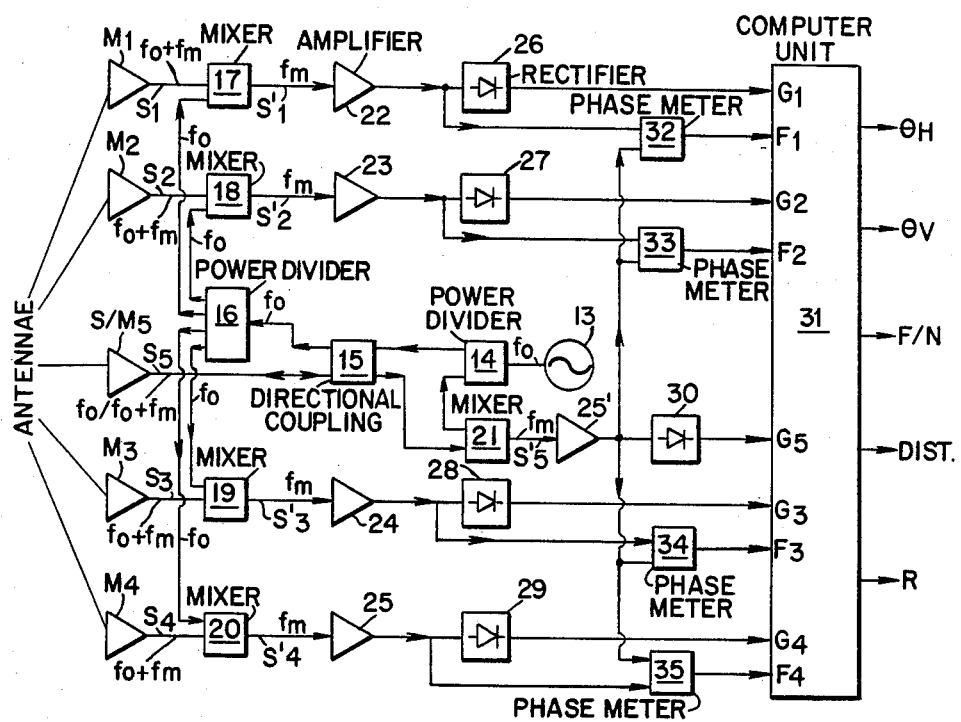
FIG. 10 is a block schematic of a transmitter/receiver unit for both phase and amplitude measurement.

FIG. 10 illustrates one embodiment of such an arrangement according to the invention. This embodiment is in principle structurally similar to that described above. A microwave oscillator 13 generates a signal of frequency $f_o$, for example, a frequency of 2450 MHz. The signal is divided into six equal parts through a power divider 14, a directional coupling 15 and a power divider 16, such as to transmit the divided signal to the transmitter antenna 5, to one of the inputs of each of five respective mixers 17,18,19,20,21, the other input of which is connected to respective receiver antennae $M_1$, $M_2$, $M_3$, $M_4$ and $M_5$. The antenna $M_5$ is connected to the other input of the mixer 21 through the directional coupling 15. Thus, the transmitter antenna S transmits the frequency $f_o$. The transponder is arranged to receive the signal and to re-transmit a signal having the frequency $f_o + f_m$, where $f_m$ may be 10 kHz. The signal $f_o + f_m$ received by each of the receiver antennae is passed to respective mixers 17-21, where the signals are mixed down to the frequency $f_m$, said signals being amplified in amplifiers 22,23,24,25, and 25' connected to the output of respective mixers. Each of the amplifiers 22-25 and 25' is connected to a respective rectifier 26,27,28,29,30.

The signals $S_1'-S_4'$ obtained subsequent to mixing of the signal $f_o + f_m$ have the same mutual phase and amplitude relationships as those prevailing between the signals $S_1$–$S_5$, prior to said mixing. Subsequent to said mixing process, the signals are amplified and band-pass filtered in said amplifiers 22-25 and 25'.

A signal $G_1$–$G_5$ corresponding to the amplitude of respective signals $S_1$–$S_5$ appears on the output of respective rectifiers 26–30. These signals are passed to a respective input of a computer unit 31.

Phase measurement is effected by four phase meters 32,33,34,35 arranged to measure the phase difference between respective received signals $S_1'$–$S_4'$ and a reference phase given by the signal $S_5'$.

The signal $S_5'$ is delivered to one input of each of the phase meters, while each of the signals $S_1'$–$S_4'$ subsequent to amplification in the amplifiers 22-25, is delivered to the second input of the phase meters.

A signal $F_1$–$F_4$ corresponding to respective phase differences occurs on the outputs of respective phase meters 32–35. These signals are passed to a respective input of the computer unit 31.

Figure 9:
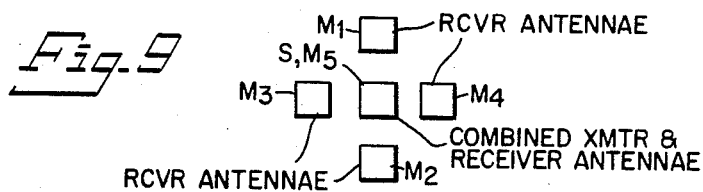
FIG. 9 illustrates a further alternative in the positioning of the antennae of the transmitter/receiver unit.

The computer unit is arranged to calculate the angle $\Theta$ between the S/M-unit and the transponder in partly two mutually perpendicular planes, for example the vertical plane ($\Theta_v$) and the horizontal plane ($\Theta_H$) in accordance with the relationships $$\Theta_H = \arcsin\left[\frac{(F_2 - F_1) \cdot c}{2\pi \cdot f_0 \cdot d}\right] \quad (12)$$

$$\Theta_v = \arcsin\left[\frac{(F_4 - F_3) \cdot c}{2\pi \cdot f_0 \cdot d}\right] \quad (13)$$

where the antenna array is that illustrated in FIG. 9 and where the distance d is the distance between the antennae $M_1$ and $M_2$ and the antennae $M_3$ and $M_4$ respectively, illustrated in FIG. 1.

The computer unit 31 is also arranged to calculate whether or not the transponder is located in the proximity zone, and to carry out calculations in accordance with the expression $$\log \frac{G_5}{(G_1 \cdot G_2 \cdot G_3 \cdot G_4)^{\frac{1}{4}}} < k_5 \quad (14)$$

and $$k_6 \cdot G_5 < \max(G_1, G_2, G_3, G_4) \quad (15)$$

where $k_5$ and $k_6$ are constants chosen so as to be predetermined when undertaking respective calculations.

The left side of the expression (14) corresponds to the equation (11), but for two mutually perpendicular planes.

The right side of the expression (15) shall be read as the highest of the values $G_1$, $G_2$, $G_3$ and $G_4$.

In a corresponding manner, the following expressions apply for determining the proximity zone in one dimension, these expressions corresponding totally to the expressions (14) and (15) for two dimensions, namely $$\log \frac{G_5}{(G_1 \cdot G_3)^{\frac{1}{2}}} < k_{10} \quad (16)$$

and $$k_{11} \cdot G_5 < \max(G_1, G_2) \quad (17)$$

where $k_{10}$ and $k_{11}$ are constants.

Thus, the magnitude of the proximity zone is determined by selection of the values of respective constants $k_5$ and $k_6$. In order to obtain a well-defined limit in respect of the proximity zone, the constants should be chosen so that the proximity zone obtains an extension similar to that illustrated in FIG. 5, or somewhat smaller.

The remote zone is defined by fulfilling one of the expressions (14) or (15). Thus, when one or the other of the expressions (14) or (15) is fulfilled, the computer unit 31 is programmed to determine the angular position between the S/M-unit and the transponder, by calculating the angles $\Theta_v$ and $\Theta_H$ in accordance with the equations (12) and (13).

When none of the conditions is fulfilled, the computer unit 31 is programmed to switch to a mode for calculating the angles $\Theta_H$ and $\Theta_v$ according to the equations:

$$\Theta_H = k_7 \cdot \log\left(\frac{G_2}{G_1}\right) \quad (18)$$

$$\Theta_v = k_8 \cdot \log\left(\frac{G_3}{G_4}\right) \quad (19)$$

where $k_7$ and $k_8$ are constants, i.e. in accordance with the aforegoing, and is programmed to determine the magnitude R in accordance with the equation $$R = \frac{G_5}{(G_1 \cdot G_2 \cdot G_3 \cdot G_4)^{\frac{1}{4}}} \quad (20)$$

i.e. in accordance with the principle aforedescribed with reference to the equation (11).

In a corresponding manner, determination of the magnitude R in one dimension is effected with the aid of the equation $$R = \frac{G_5}{(G_1 \cdot G_2)^{\frac{1}{2}}}$$

As will be seen from the aforegoing, inter alia from the description made with reference to FIG. 8, the magnitude R constitutes a measurement of the distance between the first object (S/M) and the second object (T).

In certain applications it is desirable to cause, for example, the S/M-unit carrier, such as a robot, to seek and to move towards the transponder. Thus, in this case it is necessary to be informed when the transponder is located in the proximity zone of the S/M-unit. In addition, it is often desirable to stop the robot when the S/M-unit is located at a given distance from the transponder. This predetermined distance is given unequivocably by a given value of the magnitude R. Such predetermined values are determined empirically and stored in a memory association with the computer unit.

However, it is also desirable at times to obtain information relating to the prevailing distance between the S/M-unit and the transponder when the transponder is located in the proximity zone.

In cases such as these, the aforegiven functional relationship $Z=F(R)$ is determined empirically. The relationship can be stored as a series of R-values coupled to corresponding Z-values. However, the series of empirically determined measurement values can be given an analytical expression by assigning a polynominal function or a logarithmic (log) function in a conventional manner, and determining its constants with the aid of the empirically determined values. In this respect, the least square error method can be applied for example.

The thus determined analytical expression $Z=F(R)$ is introduced into the computer unit, said unit being programmed to insert the calculated magnitude R into the expression $Z=F(R)$ and therewith determine the absolute distance Z.

The computer unit 31 is provided with outputs on which the unit is arranged to provide signals corresponding angle $\Theta_H$ and the angle $\Theta_v$ and the magnitude R and optionally the distance Z (dist). There may also be provided an output which produces a signal (F/N) indicating whether the computer unit operates in its proximity mode or its remote mode. These signals can be applied to, for example, a control and regulating unit for, for example, a robot, or to some other unit where the signals are utilized.

Figure 11:
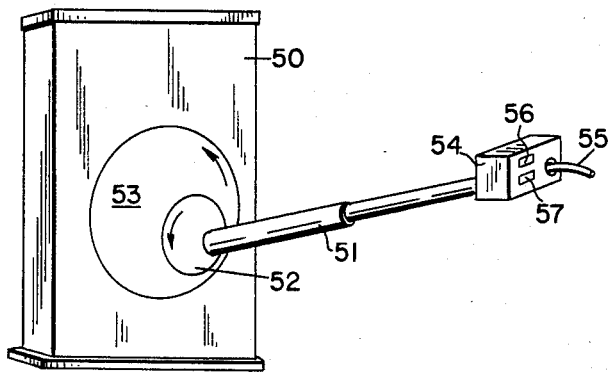
FIGS. 11 and 12 illustrate examples of the manner in which the invention can be applied.

One of a particularly large number of the uses to which the present invention can be put will now be described with reference to FIGS. 11 and 12. The illustrated application relates to the automatic filling of vehicle gasoline tanks.

The illustrated embodiment includes a fuel pump 50 provided with a telescopically extensible robot arm 51. The robot arm 51 is mounted concentrically on a first rotatable plate 52, which in turn is mounted concentrically on a second rotatable plate 53, the diameter of which is approximately twice that of the firstmentioned plate. By rotating both plates 52, 53, the robot arm is able to reach a region in the vertical plane, which is corresponded by the larger plate 53. Attached to the free end of the robot arm 51 is a robot head 54 which incorporates a tube having a withdrawable and retractable hose 55 connected to the fuel tank of the fuel pump 50, an S/M-unit 56 of the aforedescribed kind and a mechanical means 57 for opening the fuel-filling line of an automobile.

Figure 12:
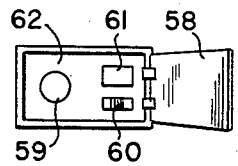

FIG. 12 illustrates the fuel-filling location of an automobile. To this end, said location includes a cover plate 58 which can be opened automatically or from the driver's seat, a fuel-filling line 59 and a mechanical means 60 for opening said line, and a transponder 61.

When the automotive vehicle is placed within the working range of the robot and the cover plate 58 is opened, the S/M-unit detects the presence of the transponder 61. A robot regulating and control unit for the robot is activated by a microdata processor to which the computer unit 31 is connected. The control and regulating unit then moves the robot head towards the fuel-filling location 62, until the transponder 61 is located in the proximity zone. This is effected by rotating the plates to the necessary extent and by telescopically extending the robot arm with the aid of suitable drive means. The computer unit successively controls the aforesaid criteria relating to the proximity zone. When the transponder is located in the proximity zone, the computer unit 31 switches to said proximity mode, and thus guides the antennae of the S/M-unit onto the antenna of the transponder, via the microdata processor and the control and regulating unit, until the transponder is located at a pre-determined distance from the robot head, wherewith the mechanical members 57,60 are in contact with one another. The robot-head member may, for example, have the form of a motor-driven gear ring which co-acts with the other mechanical member 60, which may also have the form of a gear ring, in a manner to open the fuel-filling line 59 of the automotive vehicle in a suitable manner. The hose 55 is then located in said direction of alingment at the mouth of the line or ducting 59. The hose 55 is then inserted through a short distance into the line or ducting 59, whereafter a given quantity of fuel is dispensed.

Subsequent to dispensing the aforesaid given quantity of fuel, the hose 55 is retracted into the robot arm 51, the fuel-filling line 59 is closed by the members 57,60, and the robot head returns to its starting position close to the fuel pump 50.

Although the invention has been described with reference to a robot by way of example, it will be understood that the invention embraces any suitable application.

The invention is not restricted to the aforedescribed embodiments and modifications can be made within the scope of the following claims.

I claim:

1. A method for determining a relative position between two objects, comprising transmitting a microwave signal from the first object, which comprises a transmitter receiver (S/M-unit), toward the second object, causing said second object to receive said signal and retransmit a signal which is caused to be received by the first object on at least two antennae ($M_1$, $M_2$), characterized in that the transmitter/receiver unit (S/M-unit) of the first object is caused to transmit said signal at a fixed frequency $f_o$ from a transmitter antenna; in that the second object (T) is caused to re-transmit said signal modulated with a signal of frequency $f_m$; in that the two antennae ($M_1$, $M_2$) of the first object are placed symmetrically on respective sides of the transmitter antenna (S) and in an antenna plane common with the transmitter antenna (S); so that each of the two receiving antenna receives the retransmitted signal and in that an angle ($\Theta$) between said antenna plane and said second object, at least in one dimension, namely in a first plane extending through the transmitter antenna and the two receiver antennae, is determined by a phase comparison or an amplitude comparison respectively of said received signals in dependence on whether the second object (T) is located in the so-called proximity zone of the first object or not, i.e. at a distance which is shorter than a distance of the same order of magnitude as the distance d between the two receiving antennae ($M_1$, $M_2$) or not, wherein when the second object (T) is located outside the proximity zone said angle ($\Theta$) is determined by a phase comparison between the signal received on respective receiver antennae ($M_1$, $M_2$) subsequent to being mixed with the transmitted signal $f_o$, where the phase difference ($F_2-F_1$) between the received signals is determined; and in that said angle ($\Theta$) is determined from the equation expression $$\theta = \arcsin\left[\frac{(F_2 - F_1) \cdot c}{2\pi \cdot f_o \cdot d}\right]$$

where $F_1$ is a signal corresponding to the phase difference between the transmitted signal $f_o$ and one of the signals received by the S/M unit, $F_2$ is a signal corresponding to the phase difference between the transmitted signal $f_o$ and the other of the signals received by the S/M unit, c is the speed of light and d is the distance between the two receiver antennae, by means of a computer unit (31) associated with the S/M-unit.

2. A method according to claim 1, characterized in that an angle $\Theta'$ between said antenna plane and the second object (T) is also determined in a second dimension, namely in a second plane extending at right angles to said first plane, by placing a further two receiver antennae ($M_3$, $M_4$) symmetrically on different respective sides of the transmitter antenna (S) in said antenna plane and caused to receive said re-transmitted signal in a plane at right angles to said first plane; and in that the phase difference ($F_4-F_3$) between the phase of signals respectively received by the further two antennae ($M_4$, $M_3$) is determined, whereafter the angle $\Theta'$ is determined by means of said equation expression into which $F_4-F_3$ is inserted instead of $F_2-F_1$, and where d signifies the distance between the further two receiver antennae.

3. A method according to claim 2 characterized in that the computer unit (31) associated with the S/M-unit is caused to calculate whether or not the second object (T) is located in the so-called proximity zone of the first object (S/M-unit), by establishing whether the following two expressions relating to measurement in one dimension $$\log \frac{G_5}{(G_1 \cdot G_2)^{\frac{1}{2}}} < k_{10} \qquad (16)$$

and $$k_{11} \cdot G_5 < \max(G_1, G_2) \qquad (17)$$

or the following two expressions relating to measurement in two dimensions $$\log \frac{G_5}{(G_1 \cdot G_2 \cdot G_3 \cdot G_4)^{\frac{1}{4}}} < k_5 \qquad (14)$$

and $$k_6 \cdot G_5 < \max(G_1, G_2, G_3, G_4) \qquad (15)$$

are fulfilled or not, where $G_1$ and $G_2$ are the amplitudes of the respective signals received by the firstmentioned two receiver antennae ($M_1$, $M_2$), and where $G_3$ and $G_4$ are the amplitudes of respective signals received on said two further receiver antennae ($M_3$, $M_4$), and where $G_5$ is the amplitude of the signal received by said transmitter antenna (S) which is caused to receive signals through a receiver antenna ($M_5$), and where $k_{10}$, $k_{11}$, $k_5$ and $k_6$ are pre-determined constants; and in that the second object (T) is considered to be located in said proximity zone when none of the expressions (16) and (17) is fulfilled with respect to one dimension, and when none of the expression (14) and (15) is fulfilled with respect to two dimensions.

4. A method according to claim 3, characterized in that when said second object (T) is shown by said equation expression to be located in the proximity zone, said angles $\Theta$, $\Theta'$ are determined by amplitude comparison effected by the computer unit (31) from the expressions $$\Theta = k_7 \cdot \log\left(\frac{G_2}{G_1}\right)$$

$$\Theta' = k_8 \cdot \log\left(\frac{G_3}{G_4}\right)$$

where $k_7$ and $k_8$ are pre-determined constants.

5. A method according to claim 3 characterized in that when it is established through said equation expression that said second object is located in the proximity zone, a magnitude R is determined by the computer unit (31) from the equation $$R = \frac{G_5}{(G_1 \cdot G_2)^{\frac{1}{2}}}$$

in that case when measurement is effected in one dimension, or from the equation $$R = \frac{G_5}{(G_1 \cdot G_2 \cdot G_3 \cdot G_4)^{\frac{1}{4}}}$$

in that case when measurement is effected in two dimensions, where R is a measurement of the distance Z between the first object and the second object.

6. Apparatus for determining a relative position between two objects, comprising a first object provided with a transmitter/receiver unit (S/M) adapted to transmit a microwave signal to the second object (T), said second object being adapted to receive a signal and re-transmit a signal which is arranged to be received by the transmitter/receiver unit (S/M) where the transmitter/receiver unit is provided with at least two receiver antennae ($M_1$, $M_2$) enabling receiving, on both antenna ($M_1$, $M_2$), the re-transmitted signal, and where the S/M-unit incorporates mixers (9,11; 17,18) arranged to mix the signal received from respective receiver antennae ($M_1$, $M_2$) with the transmitted signal, and include phase-comparison circuits (32,33) arranged to compare the phase position of respective received signals in relation to the phase of the transmitted signal; characterized in that the transmitter/receiver unit (S/M) is adapted to transmit a signal of fixed frequency $f_o$ from a transmitter antenna (S); in that the second object (T) is adapted to retransmit said signal modulated with a signal of frequency $f_m$; in that said receiver antennae ($M_1$, $M_2$) are being placed symmetrically on a respective side of the transmitter antenna (S) and in an antenna plane common with the transmitter antenna (S) and in that a computer unit (31) is provided for calculating the phase difference ($F_2-F_1$) between the received signals and adapted to calculate the angle $\Theta$ between said antenna plane and said second object (T), at least in one dimension, namely a first plane extending through the transmitter antenna (S) and the two receiver antennae ($M_1$, $M_2$) from the equation expression $$\theta = \arcsin\left[\frac{(F_2 - F_1') \cdot c}{2\pi \cdot f_o \cdot d}\right]$$

where $F_1$ is a signal corresponding to the phase difference between the transmitted signal $f_o$ and one of the signals received by the S/M unit and $F_2$ is a signal corresponding to the phase difference between the transmitted signal $f_o$ and the other of the signals received by the S/M unit, c is the speed of light and d is the distance between the two receiver antennae $M_1$, $M_2$.

7. Apparatus according to claim 6, characterized in that there are provided two further receiver antennae ($M_3$, $M_4$) which are placed symmetrically on respective sides of the transmitter antennae (S) in said antenna plane and in a second plane extending at right angles to said first plane and which are arranged to receive said re-transmitted signal; in that there are provided a further two mixers (19,20) and a further two phase-comparison circuits (34,35) arranged in the manner disclosed in claim 6; and in that the computer unit is also arranged to calculate the angle $\Theta'$ between said antenna plane and said second object in a second dimension, namely in said second plane, from the aforementioned equation expression, where the phase difference $F_4-F_3$ occurring respectively between the phases of signals on the two further receiver antennae ($M_4$, $M_3$) is inserted instead of $F_2-F_1$, and where d indicates the distance between the further two receiver antennae ($M_3$, $M_4$).

8. Apparatus according to claim 6 characterized in that the transmitter/receiver unit (S/M) is also arranged to measure the amplitude of respective received signals by means of circuits (26,27,28,29,30) incorporating rectifiers; in that the transmitter antenna (S) is also arranged to receive, through a receiver antenna ($M_5$) the signal re-transmitted by the second object (T); and in that the computer unit (31) is arranged to calculate whether or not the second object (T) is located in the so-called proximity zone of the first object (S/M), i.e. at a distance closer than a distance of the same order of magnitude as said distance d or not, by establishing by calculation whether the following two expressions relating to measurement in one dimension $$\log \frac{G_5}{(G_1 \cdot G_2)^{\frac{1}{2}}} < k_{10} \qquad (16)$$

or $$k_{11} \cdot G_5 < \max (G_1, G_2) \qquad (17)$$

or the following two expressions relating to measurements in two dimensions $$\log \frac{G_5}{(G_1 \cdot G_2 \cdot G_3 \cdot G_4)^{\frac{1}{4}}} < k_5 \qquad (14)$$

or $$k_6 \cdot G_5 < \max (G_1, G_2, G_3, G_4) \qquad (15)$$

are fulfilled or not where $G_1$ and $G_2$ are the amplitudes measured by said circuit (26,27) of a signal received by the two firstmentioned respective receiver antennae ($M_1$, $M_2$), where $G_3$ and $G_4$ respectively are amplitudes measured by said circuits (28,29) of a signal received by the two further respective receiver antennae ($M_3$, $M_4$), and where $G_5$ is the amplitude of a received signal measured by said circuit (30) at the receiver antenna $M_5$ of the transmitter antenna, and where $k_{10}$, $k_{11}$, $k_5$ and $k_6$ are pre-determined constants inserted into the computer unit, the second object (T) being considered to be located in the proximity zone when none of the expressions (16) and (17) with respect to one dimension or when none of the expressions (14) and (15) with respect to two dimensions is fulfilled.

9. Apparatus according to claim 8, characterized in that, when the second object (T) is located in the proximity zone, the computer unit is programmed to calculate said angles $\Theta$, $\Theta'$ from the expressions $$\Theta = k_7 \cdot \log \left( \frac{G_2}{G_1} \right)$$

$$\Theta' = k_8 \cdot \log \left( \frac{G_3}{G_4} \right)$$

where $k_7$ and $k_8$ are pre-determined constants.

10. Apparatus according to claim 8 characterized in that when the second object (T) is located in the proximity zone, the computer unit (31) is programmed to calculate a magnitude R from the equation $$R = \frac{G_5}{(G_1 \cdot G_2)^{\frac{1}{2}}}$$

when measurement in one dimension is concerned, and from the equation $$R = \frac{G_5}{(G_1 \cdot G_2 \cdot G_3 \cdot G_4)^{\frac{1}{4}}}$$

when measurement in two dimensions is concerned, where R is a measurement of the distance Z between the first object and the second object.

* * * * *

UNITED STATES PATENT AND TRADEMARK OFFICE
CERTIFICATE OF CORRECTION

PATENT NO. : 4,728,955

DATED : March 1, 1988

INVENTOR(S) : BENGT HANE

It is certified that error appears in the above-identified patent and that said Letters Patent is hereby corrected as shown below:

IN THE SPECIFICATION:

Column 5, line 65, change "$G_1/G_2 < 1$" to --$G_1/G_2 > 1$--.

Signed and Sealed this

Nineteenth Day of July, 1988

Attest:

DONALD J. QUIGG

*Attesting Officer*   *Commissioner of Patents and Trademarks*